M. HAVENS, Jr.
CONDUIT FITTING.
APPLICATION FILED FEB. 18, 1910.

1,044,521.

Patented Nov. 19, 1912.

WITNESSES:
Chas. H. Hughes.
R. L. Wallau.

INVENTOR.
Morton Havens Jr.
BY
Harry De Wallau
ATTORNEY.

COLUMBIA PLANOGRAPH CO., WASHINGTON, D. C.

UNITED STATES PATENT OFFICE.

MORTON HAVENS, JR., OF ALBANY, NEW YORK.

CONDUIT-FITTING.

1,044,521. Specification of Letters Patent. Patented Nov. 19, 1912.

Application filed February 18, 1910. Serial No. 544,563.

*To all whom it may concern:*

Be it known that I, MORTON HAVENS, Jr., a citizen of the United States, residing at Albany, in the county of Albany and State of New York, have invented certain new and useful Improvements in Conduit-Fittings, of which the following is a specification.

This invention relates to improvements in service entrance conduit fittings, and has for its object to provide a simple, strong, convenient and inexpensive fitting of the class, adapted especially for mounting upon the outside of a dwelling or shop for receiving, supporting and protecting service entrance wires employed for low potential electric installations, such as domestic lighting, or where but one or two consumers are to be served with the electric power for light manufacturing or lighting.

A particular object is to provide a light serviceable fitting comprising but two parts formed-up out of sheet metal, and constructed and arranged to shed water, as well as, to protect the wires from abrasion.

Other features and parts of the device will be understood from the detail description which follows, and by reference to the accompanying drawing which forms a part of this specification, and in which—

Figure 1:
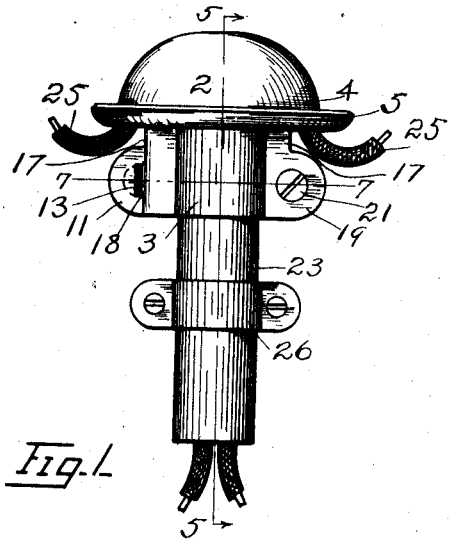
Figure 2:
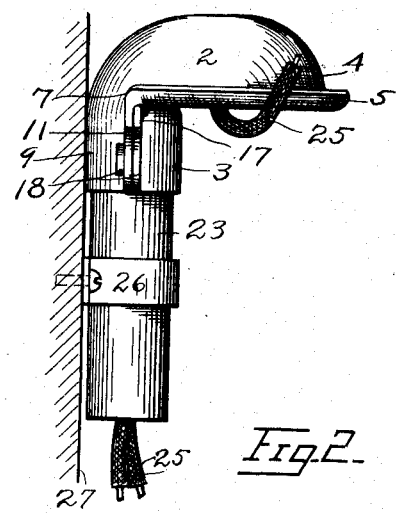
Figure 3:
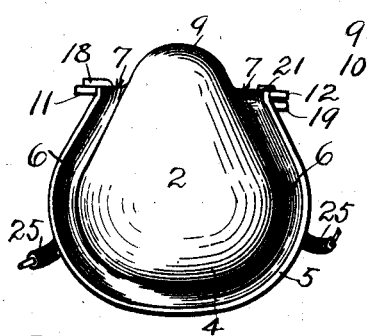
Figures 4, 5:
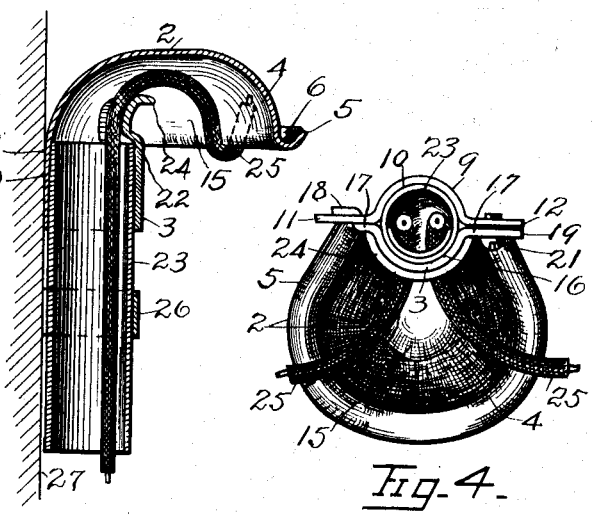
Figure 6:
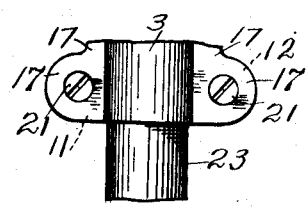
Figure 7:
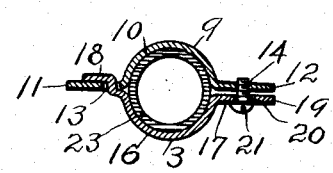

Figure 1 is a front elevation of the complete device, showing wires in place. Fig. 2 is a side elevation of same. Fig. 3 is a top plan view of the fitting. Fig. 4 is a bottom plan view of the same. Fig. 5 is a central vertical longitudinal section on line 5—5 of Fig. 1, showing the construction and arrangement of the parts of the fitting. Fig. 6 is a view, showing a modified form of clamping piece. Fig. 7 is a detail view of the interlocking clamping piece.

Similar numerals of reference are assigned to corresponding parts throughout the several views.

The present invention consists of a two-part fitting for mounting upon the receiving end of an electric conduit pipe, which may be located in any convenient manner on the side of a building or other support.

The purposes of the fitting are to afford means for receiving and supporting the branch wires which connect the mains with local lighting or power circuits, for preventing moisture from entering the conduit pipe, and for protecting the wires from abrasion, short circuits and grounds.

In the drawing, 2 represents the main part of the fitting, and 3 a coacting clamping member, each of said parts being made of sheet metal. The main part 2 consists of an enlarged overhanging dome portion 4, which is provided at its front and at its opposite sides with a marginal flange 5 bent upwardly toward its outer edge forming an upwardly opening groove or trough 6, which skirts the front and the two opposite sides of the portion 4 and is open at opposite ends at 7 at the rear of the portion 4 to discharge water or moisture rearwardly at each side of said portion. The rear side of the body 2 is provided with an integral depending portion 9, arranged substantially at right angles to the top 4, and formed with a forwardly facing vertical groove 10 arranged centrally with the body. The depending portion 9, which is thus substantially semi-cylindrical, merges at its top into the rear surfaces of the dome portion and terminates at its side edges in upright lateral flanges or lugs 11 and 12 which are united at their tops to the rear ends of the flange 5 and form continuations of said flange, the rear faces of the lugs 11 and 12 being arranged substantially flush with the ends of the groove or trough 6.

The lug 11 is slotted at 13, and the lug 12 has a threaded perforation 14, for affording means for mounting the clamping piece 3. The main part 4 is provided with an internal chamber 15 arranged beneath the dome and inclosed by the flange 5 and trough 6, which chamber increases in width, and the top intermediate portion thereof is concavo-convex in cross-section. The chamber 15 has a large mouth which faces downwardly and is arranged for receiving and protecting branch electric wires which approach the fitting on their way from the mains to a building.

The clamping member 3, is substantially semi-cylindrical in cross-section, the lengthwise groove 16 thereof being complemental to the groove 10 of the depending portion 9. The lower part of the member 3 is of greater diameter than the intermediate part of said member and terminates at its sides in upright lateral flanges 17, 17 corresponding to and opposed to the lugs or flanges 11 and 12 of the depending part 9. The upper ends of the flanges 17, 17 normally coact with the contiguous under-surface of the rear ends of the marginal flange 5 for facilitating the positioning of the clamping member. One of the flanges 17 is provided with a Z-shaped ear 18 for interlocking with the slot 13 of the lug 11, as best seen in Figs. 4 and 7. The other flange 17 is provided with an ear 19 perforated at 20 to receive a screw or bolt 21 which may be screwed into the perforation 14 of the lug 12 for adjustably mounting the member 3 upon the depending part 9.

The middle upper part of the clamping member 3 is bent inwardly or contracted in a manner to form on its inner face a stop-shoulder 22 for the upper end of a conduit pipe 23. The arrangement of the clamping piece 3 and the depending portion 9 of the body is such, that when the former is mounted upon the latter, the grooves 10 and 16 provide a substantially cylindrical opening for receiving the end of the conduit 23, which may be rigidly clamped and held in position in the grooves by the tightening up of the screw 21. All of these parts are positioned so as to be sheltered and protected from the weather by the overhanging part 4 of the body, as shown. The extreme upper end of the clamp 3 is deflected or extended outwardly to provide a curved rim 24, over which the wires, as 25, pass on entering the fitting for connecting with the conduit or local circuit. The upper portion of the clamping member is preferably corrugated as shown in Fig. 5, in order to suitably strengthen the rim 24 which supports the weight and strain of the wires, the rim itself being slightly rolled for presenting a smooth and rounding surface to prevent the chafing of the wires. The rim 24 of the clamping member preferably extends upwardly into the chamber 15, whereby the end of the conduit pipe is protected from moisture by the enlarged over-hanging front of the main part 4. Under this construction of the device, the wires must be deflected or bent upwardly in order to enter the chamber and be inserted into the opening formed by the grooves of the depending portions 3—9. From this arrangement of the said parts, it will be seen that, water falling upon the wires will be prevented from following them into the chamber. 26 represents a clamp for securing the conduit 23 to a support, as 27.

Fig. 6 illustrates a modification of the clamping member 3, in which both of the flanges 17, 17″ are formed alike and arranged to coincide with, and to be secured to the lugs 11 and 12 of part 9, by two screws 21, the lug 11 in this view being perforated and threaded the same as lug 12.

The entire device is preferably made of sheet metal, stamped or formed-up out of two pieces of metal of comparatively light gage, for producing a low priced fitting. At the same time owing to the peculiar shape or form given each of the parts, the device possesses great strength.

My service entrance fitting is extremely simple, strong and inexpensive. Its construction and arrangement are such as to adapt the device for being readily and quickly, as well as, rigidly applied to a conduit pipe, either before or after the pipe has been attached to a building. The provision of the domed top and the gutter 6 for shedding and discharging the water so as to prevent its entry into the chamber or conduit, together with the internal arrangement of the wire receiving chamber, and the novel and simple means for clamping the fitting to a conduit and also forming a supporting rim for the wires constitute the new and valuable features of the device, which obviously may be changed or modified in some of its parts, within the scope as defined by the appended claims, without departing from the principles or spirit of the invention.

Having thus described my invention, what I claim as new and desire to secure by Letters Patent, is—

1. A service entrance conduit fitting consisting of two members, one being composed of a single piece of sheet metal and comprising an overhanging dome portion and a depending portion, the dome portion decreasing rearwardly in width and being provided with a marginal flange at its front and at its opposite sides, the flange being bent upwardly toward its outer edge forming an upwardly opening groove open at its opposite ends at the rear of the dome portion, and the depending portion being substantially semi-cylindrical in cross-section with its lengthwise groove facing forwardly, said depending portion merging at its top into the rear surfaces of the dome portion and terminating at its side edges in upright lateral flanges secured to the other member and united at their tops to the rear ends of the marginal flange at the front and the opposite sides of the dome portion, said lateral flanges forming continuations of said marginal flange, and the rear faces of the upright flanges being arranged substantially flush with said opposite ends of the upwardly opening groove, substantially as and for the purpose described.

2. A service entrance conduit fitting consisting of two members, one being composed of a single piece of sheet metal and being substantially semi-cylindrical in cross-section with its lengthwise groove facing rearwardly, the lower part of said member being of greater diameter than an intermediate part above the same and terminating at its sides in upright lateral flanges secured to the other member, said intermediate part being of less diameter than said lower part and forming an internal annular shoulder at the juncture of said lower and intermediate parts, and the upper extremity of said member being deflected outwardly to provide a curved rim, the internal shoulder, the intermediate part of reduced diameter, and the curved outwardly extending rim serving to stiffen and strengthen the upper portion of said member, substantially as and for the purpose set forth.

In testimony whereof I affix my signature in presence of two witnesses.

MORTON HAVENS, Jr.

Witnesses:
A. ALLEN RENUZ,
C. M. GRISWOLD.

Copies of this patent may be obtained for five cents each, by addressing the "Commissioner of Patents, Washington, D. C."